(12) United States Patent
Antraygue

(10) Patent No.: US 8,548,651 B2
(45) Date of Patent: Oct. 1, 2013

(54) DEVICE FOR PILOTING A VEHICLE AND METHOD FOR THE MOTORISED ASSISTANCE AND CONTROL OF SUCH A PILOTING DEVICE

(75) Inventor: Cedric Antraygue, Villefranche de Rouergue (FR)

(73) Assignee: Ratier Figeac, Figeac (FR)

( * ) Notice: Subject to any disclaimer, the term of this patent is extended or adjusted under 35 U.S.C. 154(b) by 480 days.

(21) Appl. No.: 12/859,819

(22) Filed: Aug. 20, 2010

(65) Prior Publication Data

US 2011/0046824 A1 Feb. 24, 2011

(30) Foreign Application Priority Data

Aug. 21, 2009 (FR) .................................... 09 04021

(51) Int. Cl.
*G05D 1/00* (2006.01)
*G05D 1/08* (2006.01)
*G05D 3/00* (2006.01)
*G06F 7/00* (2006.01)
*G06F 17/00* (2006.01)

(52) U.S. Cl.
USPC ............................................................ 701/4

(58) Field of Classification Search
None
See application file for complete search history.

(56) References Cited

U.S. PATENT DOCUMENTS

| | | | |
|---|---|---|---|
| 3,482,805 A | 12/1969 | Knemeyer | |
| 3,945,590 A | 3/1976 | Kennedy, Jr. et al. | |
| 5,184,054 A | 2/1993 | Delattre et al. | |
| 6,772,054 B1 * | 8/2004 | Achache | 701/3 |
| 7,474,944 B2 * | 1/2009 | Cartmell et al. | 701/3 |
| 2006/0271249 A1 * | 11/2006 | Testrake et al. | 701/3 |
| 2008/0234881 A1 | 9/2008 | Cherepinsky et al. | |

FOREIGN PATENT DOCUMENTS

| | | |
|---|---|---|
| EP | 0 478 430 A1 | 4/1992 |
| EP | 0 713 443 B1 | 1/1997 |
| WO | 93/23797 A1 | 11/1993 |

OTHER PUBLICATIONS

French Search Report, dated Mar. 26, 2010, from corresponding PCT application.

* cited by examiner

*Primary Examiner* — Paul Danneman
(74) *Attorney, Agent, or Firm* — Young & Thompson

(57) ABSTRACT

The invention relates to a piloting device comprising a piloting component (10) which is connected to at least one steering component (13), at least one force sensor (17) which measures the forces imparted into the kinematic chain (12) by said piloting component (10), a logic circuit (23) which is adapted to develop a speed reference signal according to a predetermined function of said force signals, and a circuit for controlling at least one parallel actuator (14) as regards speed.

It extends to a method for the motorised assistance and control of a device of this kind and to an aircraft comprising a device of this kind.

16 Claims, 4 Drawing Sheets

DEVICE FOR PILOTING A VEHICLE AND METHOD FOR THE MOTORISED ASSISTANCE AND CONTROL OF SUCH A PILOTING DEVICE

The invention relates to a device for piloting a vehicle—especially a vehicle such as an aircraft or a ship comprising an aerodynamic or hydrodynamic control surface. It extends to a method for the motorised assistance and control of such a device for piloting a vehicle, which method is implemented in a piloting device according to the invention.

Unless otherwise indicated, the term "piloting" and its derivatives refer, throughout the text, to the guiding of a vehicle by a human pilot operating at least one piloting component such as a handle, hand-lever, rudder-bar, pedal, etc.

The term "link" designates, in a general way, any device which is capable of transmitting forces in both ways (in traction and compression) in a direction (a longitudinal direction) that passes through two points. It may involve, for example, a single rigid rod extending between said two points, or a plurality of parallel rods, or a plurality of taut cables associated with suitable pulleys, or any other structure which is capable of fulfilling this function.

The terms "downstream" and "upstream" are used with reference to the direction of the kinematic chain running from a piloting component to a steering component; the terms "proximal" and "distal" designate, respectively, ends or portions which are close to the piloting component and/or oriented towards the latter, and ends or portions which are close to a steering component and/or oriented towards the latter.

A device for piloting a vehicle traditionally comprises at least one piloting component which is connected, at least partly by a kinematic chain, to at least one steering component—especially a control surface of the vehicle, and at least one motorised actuator, called parallel actuator, having a driving component which is coupled in parallel into the kinematic chain in such a way as to permit automatic piloting and/or to simulate a specific dynamic behaviour of the piloting component in order to create a return to neutral and suitable sensations (especially sensations of muscular effort) which permit or facilitate piloting by a human pilot.

Traditional piloting devices, which are referred to as ones having mechanical controls, comprise a kinematic chain which connects the steering components to the piloting components in a wholly mechanical way. The kinematic chain typically comprises control gear having a link or links and/or a joint or joints and/or a slide or slides, which makes it possible to transmit movement commands and forces mechanically (with amplification if necessary) between the piloting component and each steering component. Such piloting devices having wholly mechanical controls continue to be widely used in numerous land vehicles, aerial vehicles (small planes, helicopters, etc.) or aquatic vehicles (surface or underwater vessels).

Piloting devices referred to as ones having electrical flight controls, in which the steering components are not connected to the piloting components in a wholly mechanical way by a kinematic chain, have been developed for piloting some aircrafts. However, some piloting devices having electrical flight controls have a partial kinematic chain, for example between the piloting components and a set of position sensors connected to flight control computers which generate command signals for a servocontrol having electrical inputting, and which actuates one or more steering components.

The invention relates to a piloting device comprising a kinematic chain which is connected to a piloting component and to a device for driving at least one component for steering the vehicle, and which controls may be either mechanical controls or electrical controls as well, according to the nature of said driving device.

In some situations, for example for the yaw flight control (which is generally of the wholly mechanical type) of a helicopter, the kinematic chain must incorporate a friction device (i.e. a device which provides static friction at least for some positions of the piloting component).

For example, EP 0478430 describes a friction device made up of a hysteresis-type magnetic brake at the output of the irreversible reduction gear of a parallel actuator. Such a piloting device necessarily incorporates a large number of reduction gears, leading to backlashes and risks of seizing. Moreover, the induced level of friction is not easily adjustable. Moreover, detection of the fact that control of the piloting component has been taken over requires contact microswitches which likewise backlash and are not very reliable.

EP 0713443 also describes a method of simulating friction forces which are applied according to the measured position of the piloting component. In such a method, the sensation of friction is only generated from the moment when the piloting component is in motion. There is therefore no generation of static friction. Moreover, this method does not permit compensation for static or dynamic frictions which are intrinsic to the kinematic chain (especially control gear) and the value of which can vary with time and according to the temperature. Furthermore, the implementation of this method requires the incorporation of other elements in the kinematic chain in order to ensure that the steering component is controlled from an autopilot.

The known piloting devices having a kinematic chain—especially ones having mechanical controls—also require, in addition to a parallel actuator (also called a "trim actuator" or "trim jack"): an overall damper mounted in parallel with the piloting component in order to damp abrupt movements of the pilot; a hydraulic jack mounted in series downstream of the parallel actuator in order to compensate for frictions in the control gear and to form support for those elements in the kinematic chain which are situated downstream of the jack in the direction of the steering component (and which therefore ensure irreversibility of the forces and movements induced by the autopilot, since these are not passed on to the piloting component); a motorised actuator of the electrical or electro-mechanical type, which is mounted in series, and which makes it possible to inject commands of low amplitudes and high frequencies from the autopilot into the kinematic chain; and a hydraulic servocontrol with mechanical input, the output of which is mechanically connected to the steering component in order to control its position. All these elements are heavy and bulky, are sources of faults and wear, are not adjustable and require electrical and hydraulic supplies at various places in the kinematic chain.

The object of the invention is to overcome these drawbacks by proposing a piloting device having a kinematic chain which is connected to the steering component and which makes it possible:
- to compensate for frictions in the kinematic chain (especially in the control gear);
- to simulate a friction (static friction);
- to inject commands from an autopilot in an irreversible manner, that is to say without leading to movements of the piloting component at least when the latter is not operated by the human pilot;
- to inject commands from an autopilot in a reversible manner, that is to say one which leads to movements of the piloting component;

to carry out adjusting and regulating operations in a simple manner, even after installation on the vehicle;

and which, moreover, is less bulky, simpler, lighter and more reliable than the known devices.

The object of the invention is also to propose such a piloting device which is capable, moreover, of great precision and great sensitivity and is compatible with its use on board all sorts of vehicles including aircraft such as helicopters, for example for yaw control.

The object of the invention is also to propose a method for the motorised assistance and control of such a piloting device, which method has the same advantages.

In this aim, the invention concerns a piloting device for a vehicle, which device comprises:

a kinematic chain which is connected to a piloting component and to a device which may either be (of the type having mechanical inputs, or of the type having position sensors and electrical inputs) for driving at least one steering component of the vehicle;

at least one motorised actuator, called a parallel actuator, having a driving component which is coupled into the kinematic chain in parallel with the piloting component;

wherein it comprises:

at least one force sensor adapted to measure the forces imparted by said piloting component into the kinematic chain;

a logic circuit connected to said at least one force sensor in such a way as to receive force signals delivered by the latter, said logic circuit being adapted to generate a signal, called a speed reference signal, according to a predetermined function of the value of said force signals;

a circuit, called a speed control circuit, which receives said speed reference signal and modulates a supply of said at least one of said parallel actuator, according to said speed reference signal.

The control, as regards speed, of the speed control circuit may be of the open loop type, especially if there is a sufficient level of friction in the kinematic chain. Nevertheless, advantageously and according to the invention, said speed control circuit preferably comprises a speed servocontrol loop (closed loop control) which receives the speed reference signal and modulates the supply of said at least one parallel actuator, said servocontrol loop being adapted to servocontrol the speed of the driving component of said at least one parallel actuator from said speed reference signal.

By the way, it has unexpectedly turned out that combining the measurement of forces and the control—especially the servocontrol—of such a parallel actuator as regards speed actually makes it possible to considerably simplify the device and to achieve a large number of functions while reducing the number of components necessary for this purpose. In particular, the invention makes it possible to eliminate the use of any damper at the piloting component, and of any serial hydraulic actuator for compensating for frictions in the kinematic chain. Moreover, the device according to the invention can be subjected to numerous adjusting and regulating operations, is devoid of backlash, has great sensitivity and great precision, is compatible with being associated with an autopilot, and can have a long service life which can be easily estimated and certified.

Measurement of the forces can be obtained by one or more force sensor(s) associated, in any suitable manner, with the kinematic chain. In particular, advantageously and according to the invention, at least one force sensor is interposed in series in the kinematic chain. Such a sensor may be, for example, an ordinary stress gauge. More particularly, advantageously and according to the invention, said at least one force sensor comprises an end, called proximal end, which is directly connected, by control gear having a link or links and/or a joint or joints and/or a slide or slides, to a point of actuation of said piloting component, and an other end, called distal end, which is directly connected, by control gear having a link or links and/or a joint or joints and/or a slide or slides, to a point of coupling-in of the driving component of one of said at least one parallel actuator, said force sensor being interposed in the kinematic chain between said point of actuation of said piloting component and said point of coupling-in of said driving component of the parallel actuator.

Furthermore, in a device according to the invention of the type having mechanical controls, the kinematic chain entirely connects said piloting component, to at least one steering component, and is adapted to transmit the movement commands and the forces from the piloting component wholly mechanically to each steering component. Advantageously and according to the invention, said point of coupling-in of the driving component of the said parallel actuator is disposed in the kinematic chain in such a way as to receive the reaction forces of each steering component connected to said piloting component and of any element in the kinematic chain which is interposed in series between said driving component and said steering component. Each parallel actuator is thus able to bear those reaction forces and, being subjected to control—especially servocontrol—as regards speed, prevents the retransmission of the reaction forces to the piloting component, especially those reaction forces induced by actuators integrated into the kinematic chain downstream from the point of coupling-in of the parallel actuator.

Moreover, advantageously and according to the invention, said kinematic chain is adapted to mechanically transmit the movement commands and forces from the piloting component to each steering component. This mechanical transmission may or may not incorporate means for amplifying the movements and/or forces.

In particular, advantageously and according to the invention, said kinematic chain is successively made up—between the point of coupling-in of the driving component of said parallel actuator and each steering component—of a motorised actuator mounted in series and of a hydraulic servocontrol having mechanical input, and of any suitable mechanism having a link or links and/or a joint or joints and/or a slide or slides which permits mechanical linking and the transmission of forces between those various components. The kinematic chain of a device according to the invention is preferably devoid of any other active element. In particular, said serial actuator may be an electrical or electromechanical actuator which makes it possible to inject commands of low amplitudes—especially of the order of 10% of the total amplitude of variation of the steering component (flight control)—and of major frequencies—especially of the order of 5 to 10 Hz—into the kinematic chain from an autopilot. The kinematic chain of a piloting device according to the invention may thus be devoid of any serial hydraulic actuator and of any specific device for damping the piloting component.

Furthermore, advantageously and according to the invention said logic circuit is adapted to supply a speed reference signal corresponding to a zero speed when the absolute value of the force signals is lower than a threshold value, called friction threshold, in such a way as to simulate the presence of friction forces in the kinematic chain. Consequently, while no force is imparted to each piloting component or while a force lower than the friction threshold is imparted to said piloting component, the driving component of each parallel actuator blocks any movement of the kinematic chain, and therefore of each corresponding steering component. This therefore results in a sensation of friction being generated in the piloting component for a human pilot who is acting upon the latter.

Thus, in a device according to the invention, the whole of the friction in the kinematic chain is generated by said at least one parallel actuator, and since the value of the friction threshold is predetermined and is compared to the forces measured by said at least one force sensor, any variations in the friction in the control gear and, more generally, in the kinematic chain as a whole, are automatically taken into account.

Moreover, a device according to the invention is devoid of any other active element for compensating for frictions and/or creating irreversibility of the forces and movements and, in particular, does not comprise any serial hydraulic jack. Thus, the kinematic chain is devoid of any hydraulic actuator other than said servocontrol associated with each steering component, and all the components in the kinematic chain which are situated between the steering component and the hydraulic servocontrol connected to each steering component are exclusively mechanical components of the control gear, and electrical or electromechanical actuators.

Likewise, the blocking of the kinematic chain that is imparted by each parallel actuator when the forces measured are lower than the friction threshold, permits the injection, downstream from the point of coupling-in of the driving component of such a parallel actuator, of commands from the autopilot via the serial actuator, the movements of which are entirely passed on to the steering component via the hydraulic servocontrol, and not to the piloting component which then remains immobile, locked by said parallel actuator whose driving component is kept at zero speed.

Likewise, said logic circuit is, advantageously and according to the invention, adapted to supply a speed reference signal whose value, when it corresponds to a speed other than zero, is an increasing function of the force signals, so as to simulate a predetermined damping function in the kinematic chain. It should be noted that the invention makes it possible to utilise any damping function whatsoever, and even one which can vary according to predetermined conditions. This damping function may consist, for example, in linear damping or, on the other hand, graduated damping, for example of the parabolic or other type. The logic circuit may be adapted to store a plurality of predetermined damping functions and the device according to the invention may incorporate means which make it possible (for the human pilot, according to his preferences, or for a mechanic, according to the characteristics of the vehicle, prior to use) to configure it to choose a damping function from among said plurality of stored damping functions. The logic circuit may also be adapted so as to automatically choose itself a predetermined damping function from among said plurality of stored damping functions according to predetermined operating conditions.

Moreover, in a device according to the invention, damping within the kinematic chain may advantageously be wholly generated by said at least one parallel actuator (that is to say, by the damping function applied by the latter's logic circuit of the latter). A device according to the invention may thus be devoid of any other damping element and, in particular, does not comprise a damper associated with the piloting component, the latter being connected solely to the force sensor. Moreover, in a device according to the invention, the damping is stable as regards temperature and independent from the rest of the kinematic chain, which is another advantage compared to the known devices.

Furthermore, advantageously and according to the invention the said piloting component is provided with at least one component for defining a neutral position. This may be a mere button which makes it possible to deactivate the friction threshold of the logic circuit. A human pilot is then able to move the piloting component to a position which he considers should be the neutral position from which, when he releases the button, the logic circuit reactivates the friction threshold. The device according to the invention therefore permits trim regulation.

Moreover, advantageously and according to the invention, the servocontrol loop comprises an input receiving a speed set-point signal, and said servocontrol loop is adapted to cumulate this speed set-point signal with the speed reference signal. Such a speed set-point signal is supplied, for example, by an autopilot. The servocontrol loop then controls the supply to each of said at least one parallel actuator according to the sum of the speed set-point signal and the speed reference signal, reduced by a value for the measured speed of the driving component of said parallel actuator.

In a particularly advantageous application of the invention, in which the vehicle is an aircraft, the piloting component is connected to a control surface of the aircraft by the kinematic chain.

The invention also extends to a method which is carried out in a device according to the invention. The invention also concerns a method of motorised assistance and control which is implemented in a piloting device according to the invention. The invention therefore also relates to a method for the motorised assistance and control of a device for piloting a vehicle, said device comprising:
  a kinematic chain which is connected to a piloting component and to a device for driving at least one steering component of the vehicle;
  at least one motorised actuator, called parallel actuator, having a driving component which is coupled into the kinematic chain in parallel with the piloting component;
wherein:
  the forces imparted by said piloting component into the kinematic chain are measured;
  a signal, called speed reference signal is generated in accordance with a predetermined function of said measured forces;
  at least one of said at least one parallel actuator is supplied in accordance with speed control from said speed reference signal, by modulating the supply to said parallel actuator from said speed reference signal.

Advantageously and according to the invention, said speed control is a closed-loop servocontrol which modulates the supply to said at least one parallel actuator, as mentioned above, said servocontrol being adapted to servocontrol the speed of the driving component of said parallel actuator from said speed reference signal. As a variant, there is nothing to prevent provision being made for the speed control to be of the open-loop type.

Advantageously and according to the invention, the speed reference signal is kept at a value corresponding to a zero speed when the absolute value of the force signals is lower than a threshold value, called friction threshold, so as to simulate the presence of friction forces in the kinematic chain.

Also advantageously and according to the invention, the value of the speed reference signal, when it corresponds to a speed other than zero, is generated in accordance with an increasing function of the force signals, so as to simulate a predetermined damping function in the kinematic chain.

Moreover, advantageously and according to the invention, the speed reference signal is cumulated with a speed set-point signal.

Conversely, the invention also extends to a piloting device in which such a method of motorised assistance and control according to the invention is implemented.

The invention advantageously applies, in particular, to an aircraft such as a helicopter. The invention therefore likewise extends to an aircraft comprising at least one piloting component and at least one control surface which is connected to said piloting component by a kinematic chain having mechanical transmission of forces, wherein said aircraft comprises at least one piloting device according to the invention for controlling at least one control surface of the said aircraft. However, the invention also applies to other types of vehicles, especially land vehicles and surface or underwater vessels, for example for controlling at least one hydrodynamic control surface of said vehicles.

The invention also relates to a device for piloting a vehicle, a method for the motorised assistance and control of a device for piloting a vehicle, and an aircraft, which are characterised in combination by all or some of the features mentioned hereinabove or hereinbelow.

Other aims, features and advantages of the invention will become apparent on reading the following description, which refers to the appended drawings which are given solely as non-limitative examples and in which.

Figure 1:
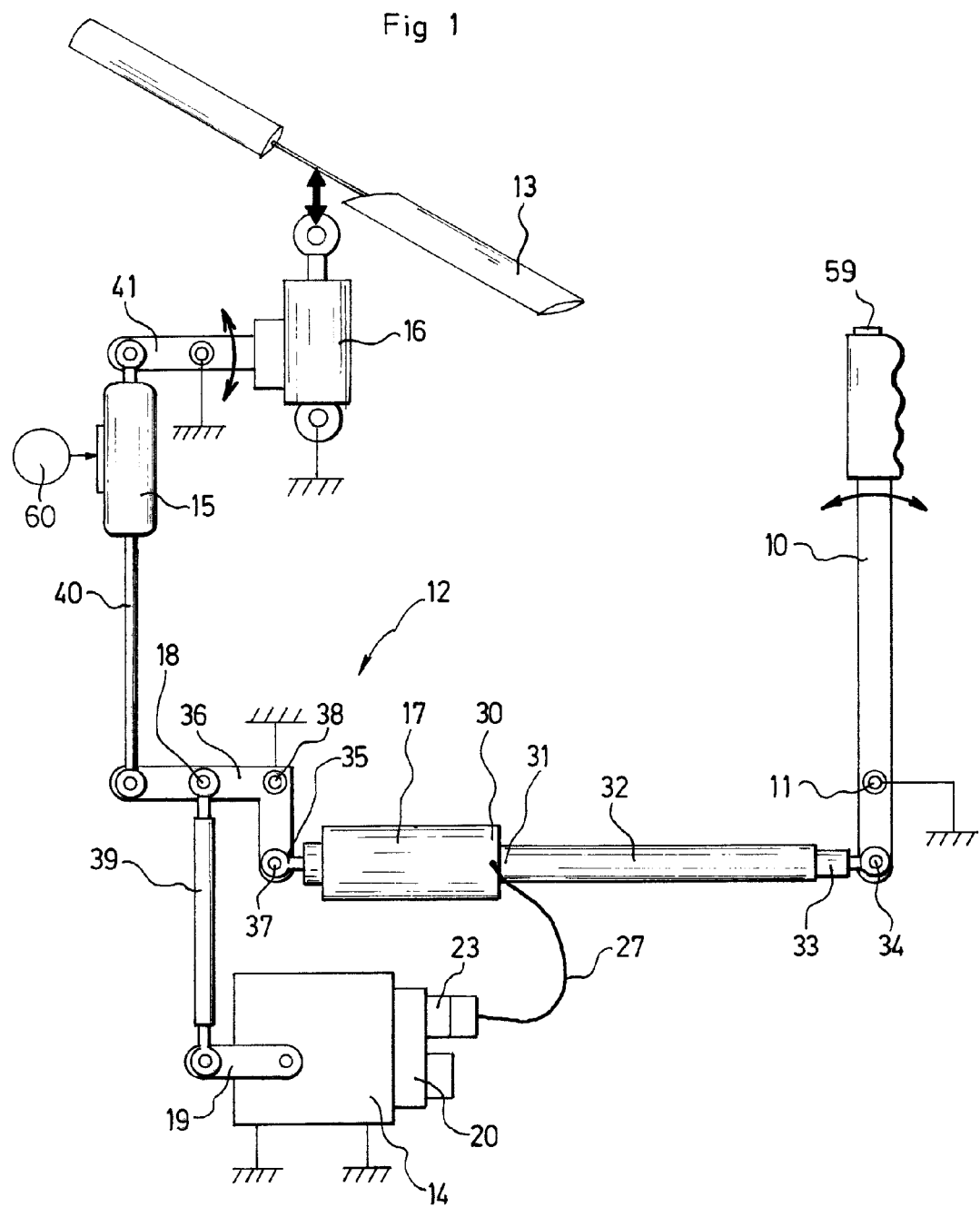
FIG. 1 is a general diagram representing a piloting device according to the invention.

FIG. 1 represents a general functional diagram of a device according to the invention. In this figure, the various elements are only represented diagrammatically in order to illustrate the invention from a functional point of view. In particular, the number, nature, form and dimensions of the various elements in the kinematic chain (especially of the control gear having a link or links and/or a joint or joints and/or a slide or slides) are not realistic and may vary considerably from one vehicle to another, and scales are not adhered to.

The piloting device represented in FIG. 1 in accordance with the invention comprises a piloting component 10 which is represented as an example in the form of a handle which is articulated about a horizontal pivot pin 11 (but which might be in any other form, for example a number of handles associated with one another (for example a pilot's handle and a co-pilot's handle), one or more rudder-bars, one or more pedals, one or more pull-handles, one or more hand-wheels, etc.). This piloting component 10 is connected by a kinematic chain 12 to at least one steering component 13 which, in the example represented, is an aerodynamic control surface belonging to an aircraft (but which might be in any other form, for example a pitch variator for a propeller, a hydrodynamic control surface, a guiding wheel, etc.).

It should be noted that a piloting device according to the invention applies to the case of a piloting component 10 which is connected to a single steering component 13 as well as to the case of a piloting component 10 which is connected to a plurality of steering components 13 (in which case the kinematic chain 12 comprises a number of branches). For example, the same rudder-bar may be connected simultaneously, on the one hand, to a steering control surface or to a rear rotor of a helicopter and on the other hand to a small front guide wheel.

The kinematic chain 12 is adapted to transmit the movement commands and forces imparted by a human pilot to the piloting component 10, while amplifying them if necessary, mechanically to each steering component 13 to which said piloting component 10 is connected. This kinematic chain 12 is made up of:
  control gear (having a link or links and/or a joint or joints and/or a slide or slides) which may be realised in any manner which is known per se;
  one or more active components (a motorised actuator or actuators, such as a jack or jacks, a return component or components, etc.) including, for each steering component 13, a parallel actuator 14 having an electric motor, a serial actuator 15 having an electric motor, and a hydraulic servocontrol 16 with mechanical input, whose output is connected to the steering component 13 in order to set its position and control its movements;
  and one or more measuring or control components, including a serial force sensor 17.

In the example represented, the hydraulic servocontrol 16 having mechanical input constitutes a device for driving the steering component 13, such that the piloting device is of the type having wholly mechanical control. On the other hand, there is nothing to prevent provision being made (as a variant which is not represented) for the servocontrol 16 having mechanical input to be replaced by a set of position sensors associated with computers capable of generating signals for controlling a hydraulic servocontrol having electrical input, that is to say, for the piloting device according to the invention to be of the type having electrical controls.

The parallel actuator 14 comprises an electric motor 20 whose output shaft is coupled to a mechanical transmission 21 which serves, especially, as a reduction gear, and a circuit 22 for supplying the motor 20, the said supply circuit 22 comprising a logic circuit 23 and a loop 24 for subjecting the motor 20 to servocontrol as regards speed.

The output of the mechanical transmission 21 has a component, called driving component 19, which is driven by the motor 20 and connected in parallel to a point 18 of coupling-in into the kinematic chain 12. The parallel actuator 14 is adapted so that the driving component 19 is locked in position, immobile, when the motor 20 is driven at zero speed, i.e. is at a standstill. In order to achieve this, the motor 20 is preferably piloted in four quadrants (by a bridge circuit in the case of a direct-current motor) in such a way that the motor 20 is capable of braking, as well as of driving, the driving component 19 and the piloting component 10: if the motor 20 is driven at zero speed and if a force is applied to the piloting component 10, the motor 20 will oppose this force (through the servocontrol loop) in order to keep the speed zero. As a variant, which is not represented, provision may be made for the mechanical transmission between the driving component 19 and the piloting component 10 to be adapted to be irreversible, in which case the motor 20 may then be driven in two quadrants.

At least one sensor 25, 26 is associated with the motor 20 and/or with the transmission 21 in order to permit the generation of a signal, called measured-speed signal 42, which is representative of the actual measured speed, ωréel, of the motor 20 and/or of the driving component 19. This may involve, especially when the motor 20 is a direct-current synchronous motor with permanent magnets and without brushes, one or more position sensors 25 which detect the angular position of the output shaft of the motor 20 and the signals from which are supplied, via a circuit 51 for formatting the signal, to a shunting circuit 53 which makes it possible to generate a measured-speed signal. As a variant, this may involve one or more speed sensors 26 associated with the output shaft of the motor 20 and/or with the driving component 19.

It should be noted that the parallel actuator 14 is particularly simple in its constituent elements, and in particular is devoid of a brake, a spring and a damper. The force sensor 17 is situated in that portion of the kinematic chain 12 which extends between the piloting component 10 and the point of coupling-in 18 of the driving component 19 of the parallel actuator 14. This force sensor 17 may be made up of a force-sensing link having strain gauges, or of a force sensor having a deformable body and of a linear position sensor (LVDT), for example such as is marketed under the reference FE337000 by the company RATIER-FIGEAC (of Figeac, France).

In the example represented, the force sensor 17 has a proximal end 30 fixed to a distal end 31 of a link 32, the proximal end 33 of which is articulated to the piloting component 10 about a pivot pin 34 which is parallel to the pivot pin 11 of the latter. The force sensor 17 also has a distal end 35 which is articulated on a deflecting corner-plate 36 along a pivot pin 37 which is parallel to the pivot pin 38 around which said corner-plate 36 is articulated in relation to a frame of the vehicle. The driving component 19 of the parallel actuator 14 is connected to the corner-plate 36 via a link 39 which is articulated, at one end, to the driving component 19 and, at its other end, to the corner-plate 36 about the pivot pin 18 which serves as a point 18 of coupling-in of the driving component 19 within the kinematic chain. The serial actuator 15 is likewise articulated, by its proximal end and via a link 40, to the deflecting corner-plate 36 and, by its distal end, to an input-controlling link 41 belonging to the servocontrol 16.

The output cable 27 of the force sensor 17 is connected to the input of the logic circuit 23 of the parallel actuator 14, in such a way that the force signal 28 supplied by the said force sensor 17 is delivered to the input of said logic circuit 23.

The logic circuit 23 is adapted to generate a speed reference signal 29 which is representative of a reference speed, ωref, of the motor 20 and/or of the driving component 19, from the force signal 28 delivered by the force sensor 17, and to do so in accordance with a predetermined law, which may be determined on manufacture or selected from among a plurality of laws stored in a memory associated with the logic circuit 23.

Figure 4:
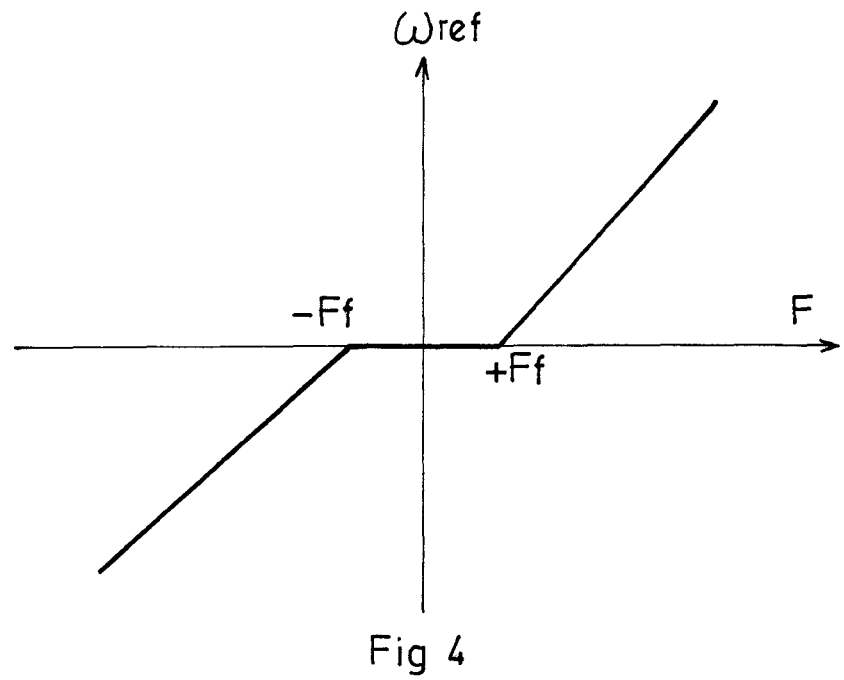
FIG. 4 is a graph representing a first damping function of a method according to the invention, which function can be used in a parallel actuator belonging to a device according to the invention.
Figure 5:
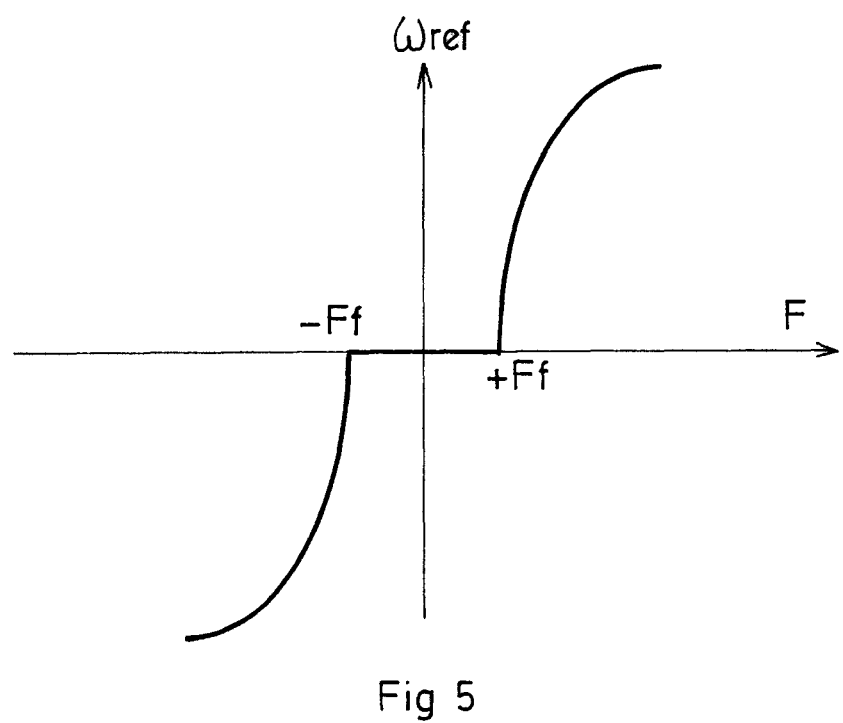
FIG. 5 is a graph representing a second damping function of a method according to the invention, the function of which can be used in a parallel actuator belonging to a device according to the invention.
Figure 6:
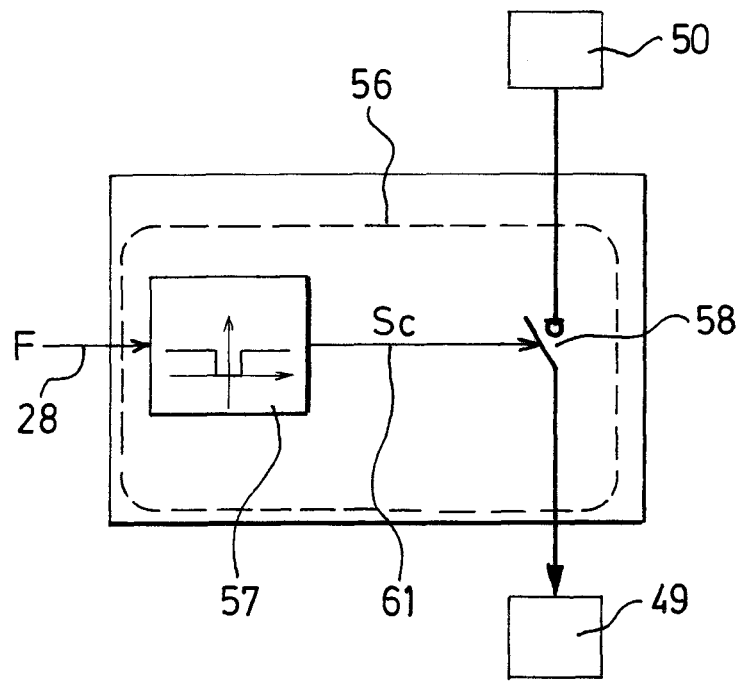
FIG. 6 is a functional diagram illustrating a module for detecting actuation, by a human pilot, of the piloting component belonging to a device according the invention.
Figure 7:
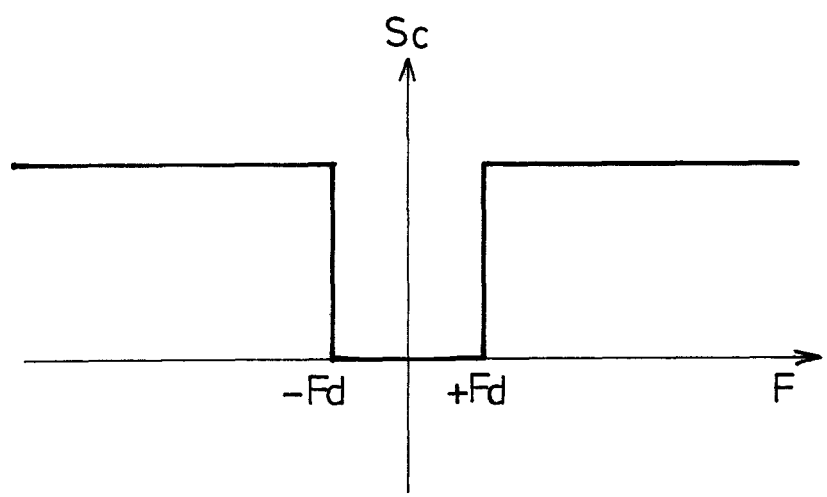
FIG. 7 is a graph representing the characteristic used by the detection module in FIG. 6.

FIGS. 4 and 5 are examples of two speed/forces laws which may be implemented by the logic circuit 23. This law passes through the zero point, in such a way that the reference speed, ωref, corresponding to the signal 29 is zero if no force is imparted to the piloting component 10. Moreover, it has a plateau which likewise sets a zero reference speed, ωref, when the forces imparted to the piloting component 10 are lower, in absolute value, than a threshold value, called the friction threshold Ff. In other words, the forces imparted by the human pilot to the piloting component 10, as measured by the force sensor 17, have to exceed the friction threshold Ff in one direction or the other (in compression or in traction) for the speed reference signal 29 to be other than zero.

When the logic circuit 23 generates a speed reference signal 29 which corresponds to a zero speed, ωref, the electric motor 20 of the parallel actuator 14 is stopped and, for example because of the control (four quadrants) of the electric motor 20 and/or of the mechanical transmission 21 incorporating a reduction gear, the driving component 19 is locked in position (zero speed). As a result, the corner-plate 36 is immobilised and, on the one hand, the reaction forces originating from the steering component 13 and/or from all the active elements which are present in the kinematic chain downstream from the point of coupling-in 18, are not passed on to the piloting component 10 and, on the other hand, the commands addressed to the serial actuator 15 by the autopilot 60 have the effect of driving solely the input link 41 of the servocontrol 16, and therefore the steering component 13, without moving those components of the kinematic chain which are situated upstream. The parallel actuator 14 thus has the effect of ensuring irreversibility of the piloting commands.

Furthermore, the speed/forces law used by the logic circuit 23 is also adapted to generate a damping characteristic when the friction threshold is exceeded and when, therefore, the piloting component 10 is driven in motion. According to this damping characteristic, the value of the reference speed, ωref, of the speed reference signal 29 is an increasing function of the forces measured by the force sensor 17. In other words, it is necessary to increase the value of the force imparted to the piloting component 10 in order to increase the value, ωref, of the speed reference signal 29, and therefore that of the speed with which the steering component 13 is driven in movement.

In the example represented in FIG. 4, this damping characteristic is linear. In the example in FIG. 5, the damping characteristic is graduated, for example parabolic, the degree of increase in the absolute value of the reference speed, ωref, according to a predetermined rate of increase in absolute value of the forces measured by the force sensor 17 which are imparted to the piloting component 10, diminishing when the absolute value of the measured forces increases. Other examples are possible and may be used, or stored so as to be capable of being used according to a configuration given by an engineer or a pilot.

The loop 24 for subjecting the supply circuit 22 to servocontrol as regards speed receives the speed reference signal 29 delivered by the logic circuit 23. This speed servocontrol loop 24 comprises an algebraic adder circuit 45 which receives the speed reference signal 29, a speed set-point signal 44, which represents a speed set-point ωcons, and which may, if necessary, be delivered by an autopilot 60 in order to inject commands of major amplitudes—especially ones greater than 10% of the total amplitude of variation of the steering component (flight control)—and low frequencies—especially ones lower than 5 Hz—into the kinematic chain, and the measured-speed signal 42. Of course, the various speeds under consideration are those of the same movable component of the parallel actuator 14, that is to say, preferably, either the speed of rotation of the output shaft of the motor 20, or the speed of the driving component 19. The algebraic adder circuit 45 delivers, at the output, a speed correction signal 46, whose value, ωcor, is supplied by:

$$\omega cor = \omega ref + \omega cons - \omega reel.$$

The speed set-point signal 44 is developed by the autopilot 60, for example in the following manner: an autopilot computer subjects the piloting component to positional servocontrol; this servocontrol is of the position/speed cascade type (a loop on the speed inside a position loop: the position loop being in the autopilot computer (which has the absolute positional information of the piloting component by signals delivered by positions sensors) and the speed loop being in the parallel actuator). The speed set-point received by the parallel actuator is the output of the position regulator of the autopilot computer.

Figure 2:
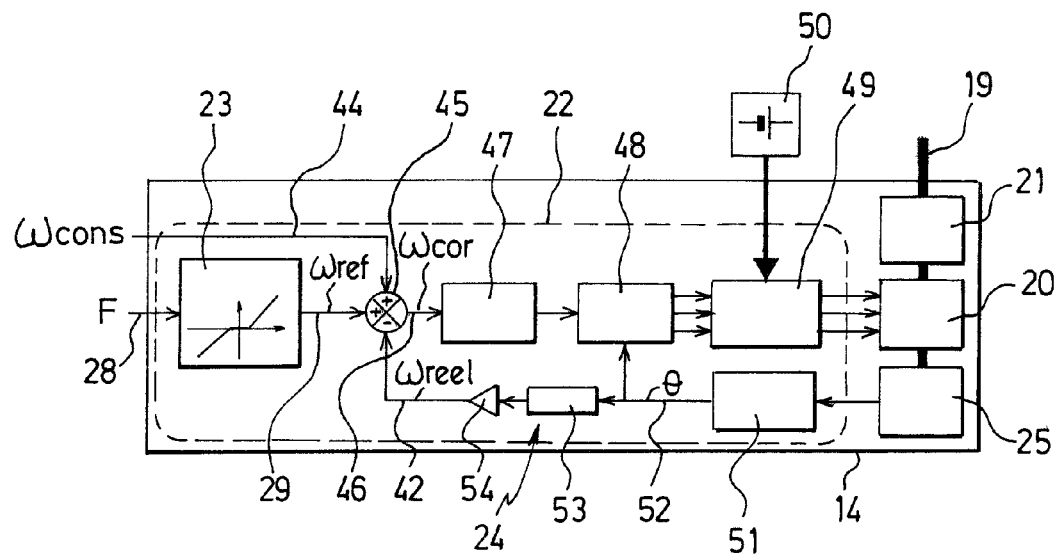
FIG. 2 is a functional diagram of a first embodiment of a parallel actuator belonging to a device according to the invention.

The speed correction signal 46 is supplied to a speed-regulating circuit 47, which may be chosen, especially, from among a PI (proportional integral) regulator, a PID (proportional integral derivative) regulator, an RST regulator, or a polynomial or other regulator. The speed-regulating circuit 47 supplies a control signal for a logic circuit 48 for controlling the supply to the motor 20, and this controlling logic circuit 48 supplies control signals to a power circuit 49 which supplies the electrical supply currents for the motor 20. In the preferred embodiment of FIG. 2, in which the motor 20 is a three-phase synchronous motor with permanent magnets and without brushes, said power circuit 49 is made up of a three-phase inverter and the controlling logic circuit 48 has the function of determining the signals for the electronic commutation of the various phases of the motor 20. The power circuit 49 is connected to a source 50 of electrical energy supplying a direct current, for example at 28 V.

In order to permit its control, such a motor 20 generally incorporates, by design, at least one sensor 25 (a rotary incremental encoder or decomposing sensor called resolver) for detecting the position of its rotor, which sensor delivers a position signal. The signal delivered by the position sensor 25 is supplied to the retroaction branch of the speed servocontrol loop 24, that is to say, to a circuit 51 for processing the signals originating from said sensor, the circuit 51 supplying a measured-position signal 52 which is representative of the instantaneous angular position 8 of the rotor of the motor 20. Said measured-position signal 52 is supplied to the logic circuit 48 for controlling the motor 20 and to a shunting circuit 53 which calculates the corresponding angular speed and whose output is supplied to an amplifier 54 which supplies the measured-speed signal 42.

Figure 3:
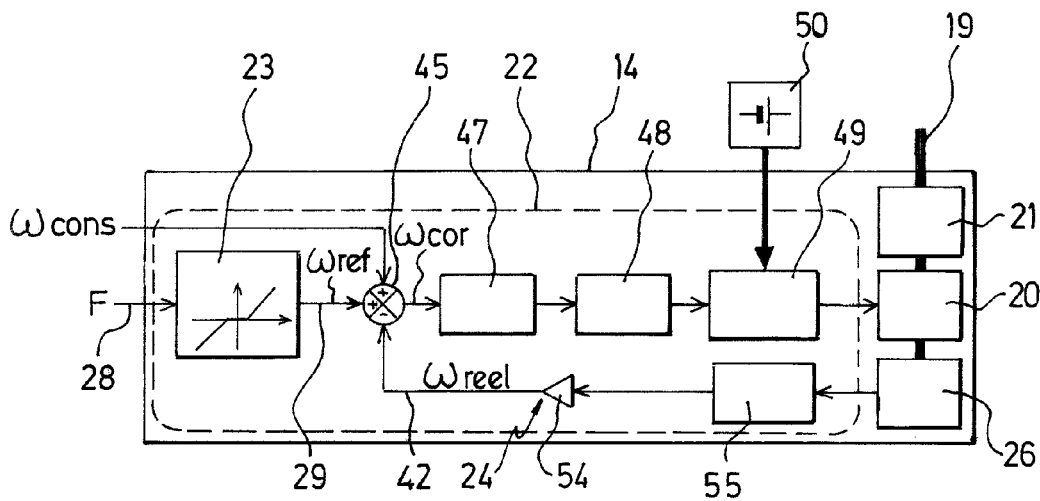
FIG. 3 is a functional diagram of a second embodiment of a parallel actuator belonging to a device according to the invention.

The variant represented in FIG. 3 differs from the preceding one in that the motor 20 is a single-phase direct-current motor, and in that the position sensor 25 is replaced by a sensor 26 for detecting the angular speed of the shaft of the motor, which sensor supplies a signal to a processing circuit 55 whose output supplies the measured-speed signal 42 via an amplifier 54.

The servocontrol loop 24 thus makes it possible to control the motor 20 as regards speed according to the value $\omega_{ref}$ calculated by the logic circuit 23 in accordance with the forces measured by the force sensor 17, and also makes it possible to recopy the commands of the autopilot 60, the commands exerted by the human pilot on the piloting component 10, which are represented by the reference speed value $\omega_{ref}$, being added to the commands of the autopilot 60, which are represented by the value of the set-point speed $\omega_{cons}$.

Furthermore, the piloting component 10 is provided with at least one button 59 which permits regulation, by the human pilot, of the neutral position of the piloting component 10, and therefore of each steering component 13 to which it is connected. This button 59 makes it possible, in particular, to command a cancellation of the friction threshold (in the logic circuit, in which Ff is then forced to assume a zero value) in such a way that the driving component 19 of the parallel actuator 14 can be moved freely. When the button 59 is released, the friction threshold is re-engaged (in the logic circuit).

As a variant (which is not represented) or as a combination, a button may be provided in order to cause the positions of the piloting component 10 to pass progressively through the parallel actuator 14, the neutral position being defined when this button is released. The said button is wired to the piloting component 10 and connected to the autopilot computer which generates a suitable speed set-point 44 for causing the positions to pass through when the button is activated.

Furthermore, the supply circuit 22 preferably incorporates a module 56 for detecting actuation of the piloting component 10. This module 56 comprises a logic circuit 57 which receives the signals delivered by the force sensor 17 and compares them with a predetermined threshold Fd. If the forces imparted to the piloting component 10 are greater, in absolute value, than this threshold value Fd, actuation of the piloting component 10 by a human pilot is detected, the logic circuit 57 emits a signal 61 (SC=1) for controlling a serial switch 58 which activates a discrete signal which is sent to the autopilot computer for the purposes of monitoring the system. Failing this, that is to say if the force sensor 17 supplies signals which are representative of the fact that the forces imparted to the piloting component 10 are lower than the threshold Fd in one direction or another, that is to say in absolute value, the control signal SC is kept at 0 so that the serial switch 58 is kept open. Detection of the actuation of the piloting component 10 by a human pilot is thus achieved in a very simple manner and without adding any backlash.

The method for the motorised servocontrol and control of the piloting device according to the invention described above therefore consists in measuring the forces imparted to the piloting component 10 and in subjecting the parallel actuator 14 to servocontrol as regards speed as indicated above.

The piloting device according to the invention has a small number of parts, is devoid of disturbing backlash, is particularly reliable and is long-lasting and inexpensive.

Such a piloting device can be used, especially, on board an aircraft for controlling at least one control surface belonging to the latter. In particular it may be applied for the yaw control of a helicopter, the piloting component 10 being a rudder-bar and the steering component 13 being the rear rotor of the helicopter.

The invention may have numerous other applications and various variants, compared to the embodiments which have been described above and represented in the drawings. In particular, the speed servocontrol loop 24 may be replaced by an open-loop control which modulates the supply to the parallel actuator according to the speed reference signal and in such a way that the speed of the parallel actuator varies according to said speed reference signal. Such an open-loop control may be contemplated especially when the level of frictions in the control gear is higher and of the order of the friction to be subjected to servocontrol. As a matter of fact, in this situation, the frictions in the control gear are sufficient to maintain a zero speed in the absence of any command.

The invention claimed is:

1. A device for piloting a vehicle, said device comprising:
   a kinematic chain which is connected to a piloting component and to a driving device for driving at least one vehicle control component of the vehicle;
   at least one motorized parallel actuator having a driving component which is coupled into the kinematic chain in parallel with the piloting component;
   at least one force sensor adapted to measure the forces imparted by said piloting component into the kinematic chain;
   a logic circuit connected to said at least one force sensor in such a way as to receive force signals delivered by the latter, said logic circuit being adapted to generate a speed reference signal for controlling the speed of said at least one motorized parallel actuator, said speed reference signal being generated according to a predetermined function of the value of said force signals; and a speed control circuit, which receives said speed reference signal and modulates a supply of said at least one of said parallel actuator, according to said speed reference signal, to control the speed of said at least one motorized parallel actuator, wherein said speed control circuit comprises a speed servocontrol loop which receives the speed reference signal and modulates the supply of said at least one motorized parallel actuator, said servocontrol loop being adapted to servocontrol the speed of the driving component of said at least one motorized parallel actuator from said speed reference signal.

2. A device according to claim 1, wherein said at least one force sensor is interposed in series in the kinematic chain.

3. A device according to claim 2, wherein said at least one force sensor comprises a proximal end, which is directly connected, by control gear having a link or links and/or a joint or joints and/or a slide or slides, to a point of actuation of said piloting component, and a distal end, which is directly connected, by control gear having a link or links and/or a joint or joints and/or a slide or slides, to a point of coupling-in of the driving component of one of said at least one motorized parallel actuator, said force sensor being interposed in the kinematic chain between said point of actuation of said piloting component and said point of coupling-in of said driving component of said at least one motorized parallel actuator.

4. A device according to claim 3, wherein the kinematic chain entirely connects said piloting component, to at least one vehicle control component, and is adapted to transmit the movement commands and the forces from the piloting component wholly mechanically to each said vehicle control component, and wherein said point of coupling-in of the driving component of the said at least one motorized parallel actuator is disposed in the kinematic chain in such a way as to receive the reaction forces of each said vehicle control component connected to said piloting component and of any element in the kinematic chain which is interposed in series between said driving component of said at least one motorized parallel actuator and said vehicle control component.

5. A device according to claim 3, wherein said kinematic chain is successively made up—between the point of coupling-in of the driving component of said at least one motorized parallel actuator and each said vehicle control component—of a motorized series actuator mounted in series and of a hydraulic servocontrol having mechanical input, and of any suitable mechanism having a link or links and/or a joint or joints and/or a slide or slides which permits mechanical linking and the transmission of forces between those various components.

6. A device according to claim 1, wherein said servocontrol loop comprises an input which receives a speed set-point signal, and wherein said servocontrol loop is adapted to cumulate said speed set-point signal with said speed reference signal.

7. A device according to claim 1, wherein said logic circuit is adapted to supply a speed reference signal corresponding to a zero speed when the absolute value of the force signals is lower than a threshold value, called friction threshold, so as to simulate the presence of friction forces in the kinematic chain.

8. A device according to claim 1, wherein said logic circuit is adapted to supply a speed reference signal whose value, when it corresponds to a speed other than zero, is an increasing function of said force signals, so as to simulate a predetermined damping function in the kinematic chain.

9. A device according to claim 1, wherein said piloting component is provided with at least one component for defining a neutral position.

10. A device according to claim 1 for piloting an aircraft wherein, said piloting component is connected to a control surface of the aircraft by the kinematic chain.

11. An aircraft comprising at least one piloting component and at least one control surface which is connected to said piloting component by a kinematic chain having mechanical transmission, wherein the aircraft comprises at least one piloting device according to claim 1 for controlling at least one control surface of the aircraft.

12. A method for motorized assistance and control of a device for piloting a vehicle, said device comprising a kinematic chain which is connected to a piloting component and to a driving device for driving at least one vehicle control component of the vehicle, and at least one motorized parallel actuator having a driving component which is coupled into the kinematic chain in parallel with the piloting component, the method comprising:

measuring the forces imparted by said piloting component into the kinematic chain;

generating a speed reference signal for controlling the speed of said at least one motorized parallel actuator, said speed reference signal being generated in accordance with a predetermined function of said measured forces;

supplying at least one of said at least one motorized parallel actuator with speed control from said speed reference signal, by modulating the supply to said at least one motorized parallel actuator from said speed reference signal to control the speed of said at least one motorized parallel actuator.

13. A method according to claim 12, wherein the said speed control is a closed-loop servocontrol which modulates the supply to said at least one motorized parallel actuator, said servocontrol being adapted to servocontrol the speed of the driving component of said at least one motorized parallel actuator from said speed reference signal.

14. A method according to claim 12, wherein the speed reference signal is kept at a value corresponding to a zero speed when the absolute value of the force signals is lower than a threshold value, called friction threshold, so as to simulate the presence of friction forces in the kinematic chain.

15. A method according to claim 12, wherein the value of the speed reference signal, when it corresponds to a speed other than zero, is generated in accordance with an increasing function of the force signals, so as to simulate a predetermined damping function in the kinematic chain.

16. A method of controlling an aircraft that has at least one piloting component and at least one control surface which is connected to said piloting component by a kinematic chain having mechanical transmission, wherein the method comprises the method according to claim 12.

* * * * *